UNITED STATES PATENT OFFICE.

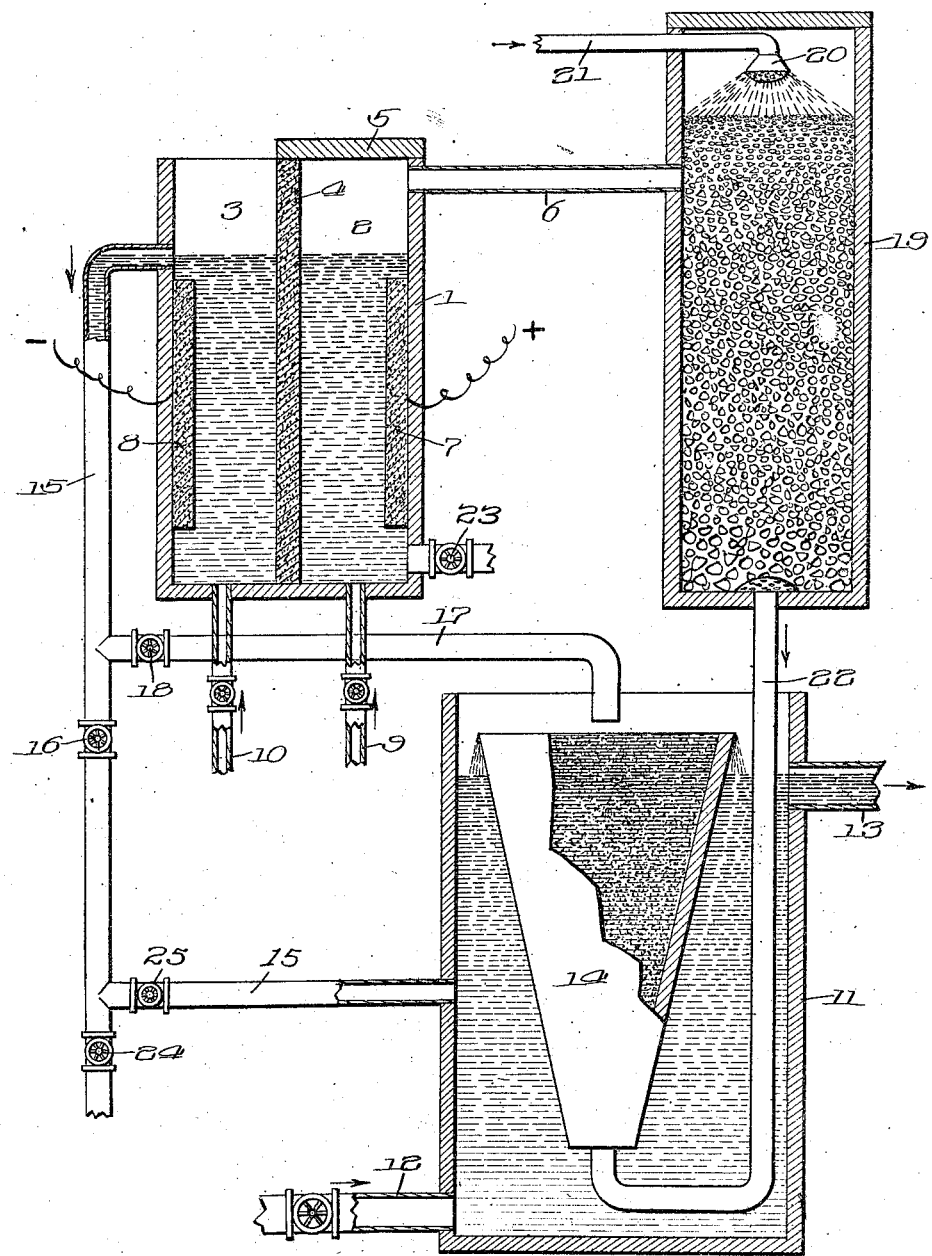

WILLIAM B. BULL, OF CHICAGO, ILLINOIS, ASSIGNOR TO CHLORIDE PROCESS COMPANY, OF CHICAGO, ILLINOIS, A CORPORATION OF ILLINOIS.

APPARATUS FOR PURIFYING WATER.

1,012,809.

Specification of Letters Patent. Patented Dec. 26, 1911.

Application filed May 10, 1911. Serial No. 626,310.

*To all whom it may concern:*

Be it known that I, WILLIAM B. BULL, a citizen of the United States, residing at Chicago, in the county of Cook and State of Illinois, have invented certain new and useful Improvements in Apparatus for Purifying Water, of which the following is a specification, reference being had to the accompanying drawing.

My invention relates to the purification of water for potable purposes, and has especially to do with the production of a suitable coagulant and its application to the water to be purified.

It relates more particularly to the purification of water by the process described in my pending application for Letters Patent Serial No. 616,731, filed March 24, 1911, and has for its object to provide an improved apparatus for practicing the process of my said application, although such apparatus is not restricted in its use to carrying out such process.

The process referred to contemplates the production of a solution of an iron compound capable of precipitation to form the coagulating agent and includes electrolysis in the production of the iron solvent. According to said process a gaseous product containing chlorin is produced by electrolytic action and is then conducted to an exterior receptacle containing water for the purpose of impregnating the water with said gas. Iron is then treated with the impregnated water, forming a solution of an iron salt which is then introduced into the water to be purified, and is either allowed to precipitate by the action of the alkaline constituents of the water, or may be precipitated by the introduction into the water of a suitable precipitant, such as the alkaline solution formed incidentally to the electrolytic action.

The apparatus which forms the subject-matter of this application is illustrated in the drawing, which is a sectional view of an embodiment of my invention in simple form.

As therein shown, 1 indicates an electrolytic cell having an anode chamber 2 and a cathode chamber 3 separated by a porous diaphragm 4 of any suitable material. As shown, the upper end of the anode chamber 2 is closed by a cover 5.

6 indicates an outlet pipe near the upper end of the anode chamber through which the gas generated passes out, and 23 indicates a valved outlet-pipe near the bottom of said chamber through which the liquid contents thereof may be withdrawn.

7 indicates the anode, which is of Acheson graphite or other suitable chemically inert material, and is placed in such position in the anode chamber as to be immersed wholly or partially in the liquid therein.

8 indicates the cathode, which may be of any suitable material.

9—10 indicate inlet pipes for supplying the electrolyte to the anode and cathode chambers. In practice water is admitted through one of said pipes and a common salt solution through the other. Said pipes are provided with valves for regulating the flow therethrough.

11 indicates a receptacle for the water to be purified, having a valved inlet-pipe 12 near the bottom thereof, and an outlet-pipe 13 at the upper portion thereof.

14 indicates a funnel-shaped receptacle arranged within the receptacle 11 and adapted to contain iron in comminuted form.

15 indicates a pipe leading from the upper portion of the cathode chamber to the receptacle 11, said pipe having valves 16 and 25.

17 indicates a branch pipe extending from the pipe 15 to a point over the receptacle 14 so that the solution formed in the cathode chamber may be discharged directly into the receptacle 14. The pipe 17 is provided with a valve 18.

24 indicates a pipe for separately discharging the solution formed in the cathode chamber, when desired.

19 indicates a mixing chamber adapted to contain coke or other inert material, said receptacle having a rose 20, or other water distributing device, at its upper end, connected with a supply pipe 21 so that water may be introduced, preferably in the form of a spray, at the upper portion of said chamber 19. The pipe 6 leading from the anode chamber communicates with the chamber 19.

The action of the electric current supplied to the anode and cathode is to effect the decomposition of the saline solution, a gaseous product containing chlorin being formed in the anode chamber and rising through the liquid therein to the upper portion of said chamber, the level of the liquid therein being considerably below the opening to the outlet-pipe 6. The level of the solutions in the anode and cathode chambers is automatically regulated by transfusion through the porous diaphragm 4. The gas formed in the anode chamber passes out through pipe 6 to the mixing chamber 19, where it is taken up by the water supplied thereto, which becomes impregnated therewith, forming a chlorin containing solution of greater or less strength, depending upon the relative volumes of chlorin and water passing through said chamber. This solution passes out of the mixing chamber 19 through a pipe 22 which communicates with the lower portion of the receptacle 14 so that the chlorin containing solution is caused to pass upward through the comminuted iron, which is acted upon to produce an iron solution, which overflows into the water contained in the receptacle 11, as indicated in the drawing. If the water is already sufficiently alkaline to effect the precipitation of the iron salt in solution, the introduction of a further precipitating reagent is unnecessary, but if desired the solution formed in the cathode chamber may be introduced thereinto, as described in my said application, this being accomplished by opening either the valves 16 and 25, or 18. When the alkaline solution formed in the cathode chamber is not so used as a precipitant, it may be removed by opening valve 24 and closing valve 25, and subjected to treatment for the recovery of the substances therein contained. By properly regulating the strength of the chlorin containing solution and the rate of its flow through the comminuted iron, a greater or less percentage of free chlorin may be introduced into the water to be purified, as hereinbefore suggested.

While the apparatus described is designed more particularly for use in carrying out the process hereinbefore referred to, it may also be used for practicing other analogous processes.

That which I claim as my invention, and desire to secure by Letters Patent, is,—

1. An apparatus for purifying water, comprising means for generating a gaseous product containing chlorin, separate means for impregnating water with such gaseous product, a receptacle adapted to contain iron, means for conducting the impregnated water through the iron in said receptacle, and a container for the water to be purified arranged to receive the product formed in said iron-containing receptacle.

2. In an apparatus for purifying water, the combination of electrolytic means for generating a gaseous product containing chlorin, separate means for impregnating water with such gaseous product, a receptacle adapted to contain iron, means for subjecting the iron in said iron-containing receptacle to the action of the gas impregnated water, and a container for the water to be purified arranged to receive the product formed in said iron-containing receptacle.

3. An apparatus for purifying water, comprising an electrolytic apparatus having an anode chamber, a chemically inert anode in said chamber, means for conducting the gaseous product from said anode chamber and impregnating water therewith, a receptacle adapted to contain iron, means for conducting the gas impregnated water to said iron-containing receptacle, and a water container arranged to receive the product formed in said iron-containing receptacle.

4. An apparatus for purifying water, comprising an electrolytic cell having anode and cathode chambers, a chemically inert anode in said anode chamber, means for conducting the gaseous product from the anode chamber and impregnating water therewith, an iron-containing receptacle, means for conducting the gas impregnated water to said iron-containing receptacle, a container for the water to be purified adapted to receive the product formed in said iron-containing receptacle, and means for subjecting the water to be purified to the action of the solution formed in the cathode chamber.

5. An apparatus for purifying water, comprising an electrolytic cell having anode and cathode chambers, a chemically inert anode in said anode chamber, means for conducting the gaseous product from the anode chamber and impregnating water therewith, an iron-containing receptacle, means for conducting the gas impregnated water to said iron-containing receptacle, a container for the water to be purified adapted to receive the product formed in said iron-containing receptacle, means for subjecting the water to be purified to the action of the solution formed in the cathode chamber, and means whereby the solution formed in the cathode chamber may be separately removed.

WILLIAM B. BULL.

Witnesses:
JOHN L. JACKSON,
MINNIE A. HUNTER.